United States Patent [19]

Gamberg

[11] Patent Number: 4,721,837

[45] Date of Patent: Jan. 26, 1988

[54] CORED TUBULAR ELECTRODE AND METHOD FOR THE ELECTRIC-ARC CUTTING OF METALS

[75] Inventor: Edward R. Gamberg, Saverna Park, Md.

[73] Assignee: Eutectic Corporation, Flushing, N.Y.

[21] Appl. No.: 780,033

[22] Filed: Sep. 25, 1985

[51] Int. Cl.$^4$ .......................................... B23K 35/368
[52] U.S. Cl. .................................... 219/69 R; 219/70; 219/74; 219/146.31
[58] Field of Search .................. 219/146.51, 68, 69 R, 219/69 E, 70, 74, 146.22, 145.1, 146.31, 146.1; 148/9.5

[56] References Cited

U.S. PATENT DOCUMENTS

| | | | |
|---|---|---|---|
| 2,818,352 | 12/1957 | Ludwig et al. | 219/146.1 |
| 2,944,142 | 7/1960 | Sjoman | 219/146.22 |
| 3,345,495 | 10/1967 | Quaas et al. | 219/74 |
| 3,345,496 | 10/1967 | Rogers et al. | 219/146.31 |
| 4,300,033 | 11/1981 | Scarton et al. | 219/69 R |
| 4,305,197 | 12/1981 | Puschner et al. | 219/145.1 |
| 4,417,962 | 11/1983 | Inoue | 219/69 E |
| 4,459,453 | 7/1984 | Inoue | 219/69 E |
| 4,464,555 | 8/1984 | Wallis | 219/69 R |
| 4,492,850 | 1/1985 | Yasuda et al. | 219/69 E |
| 4,553,019 | 11/1985 | Maeda et al. | 219/146.22 |

FOREIGN PATENT DOCUMENTS

| | | | |
|---|---|---|---|
| 1565594 | 11/1977 | Fed. Rep. of Germany | 219/146.31 |
| 2445751 | 9/1980 | France | 219/146.51 |
| 58-20397 | 2/1983 | Japan | 219/69 R |
| 120396 | 7/1984 | Japan | 219/145.22 |
| 153596 | 9/1984 | Japan | 219/145.23 |

Primary Examiner—A. D. Pellinen
Assistant Examiner—Geoffrey S. Evans
Attorney, Agent, or Firm—Hopgood, Calimafde, Kalil, Blaustein & Judlowe

[57] ABSTRACT

A flux cored tubular metallic arc cutting electrode having a steel tube with a core composition of particulate carbonaceous material which is drawn and compacted within the steel tube by reducing the size of the tube. Preferably the carbonaceous material contains at least 75% carbon and additive selected from the group consisting of arc stabilizers, fluxing agents, and gas formers. The electrode is characterized in use by reduced dross formation.

19 Claims, 4 Drawing Figures

CORED TUBULAR ELECTRODE AND METHOD FOR THE ELECTRIC-ARC CUTTING OF METALS

This invention relates to cored tubular electrodes and to a method for the electric-arc cutting or gouging of metals.

STATE OF THE ART

It is known to cut, gouge and chamfer steel plates, and the like, at relatively high rates of speed using the heat of an electric arc. One method is the carbon arc cutting of metals using an air stream to remove the melted metal.

In air carbon arc cutting, an arc is established between a carbon-graphite electrode and the metal workpiece to be melted. A compressed air jet or jets are continuously directed to the point of melting to eject the molten metal.

Metal removal using the air carbon arc procedure is continuous as the carbon arc is advanced in the cut. The process is used for severing and gouging, the gouging being sometimes used for weld groove preparation and for the removal of a weld root or a defective weld zone.

The working end or tip of the electrode is heated to a high temperature by the arc current and does not melt. The electrode is consumed during cutting, the carbon being lost by oxidation or sublimation of the tip. Air carbon arc cutting requires an electrode holder, cutting electrodes, a power source and an air supply. The process may be carried out either manually or mechanically.

The metal workpiece or substrate is continuously heated and melted while forcibly blowing the melted metal from the cut by directing a free, high velocity stream of air along one side of the exposed surface of the working end of the electrode. Under proper operating conditions, the air stream sweeps beneath the electrode tip. The arc length should have sufficient clearance to provide continuous flow of air into the cut. The flow of air is preferably parallel to the axis of the electrode. Thus, as the stream of air passes between the electrode and the metal substrate, the force of the high velocity stream of air is sufficiently great to effectively remove the melted metal from beneath the arc and provide a uniform gouging action as the electrode is being consumed.

The arc is struck by lightly touching the electrode to the workpiece and withdrawing it to the proper distance in accordance with the arc voltage requirements. The gouging technique is different from that of arc welding in that metal is removed instead of deposited. The proper arc length is maintained by moving the electrode in the direction of the cut fast enough to keep up with metal removal.

The conventional air-assisted carbon arc gouging and cutting processes have the following inherent disadvantages: (1) the carbon arc tends to be unstable and may often create an intolerable noise level; (2) under some conditions, carbon deposits may occur at the groove, whereby a portion of the substrate at the groove is carburized which is not desirable; (3) carbon electrodes are fragile and break easily during handling; and (4) there is a great tendency for fuming to occur which causes discomfort to the worker and the surrounding areas. With regard to copper-coated carbon electrodes, copper deposits may form and adversely affect subsequent operations.

It would be desirable to provide a metal electric-arc cutting electrode which is constituted to provide a stable arc, which is self-fluxing to aid in obtaining a clean cut, which may contain vapor formers, deoxidizers and gas formers, and the like, which is capable of generating heat during cutting to augment the heat provided by the electric arc.

OBJECTS OF THE INVENTION

It is an object of the invention to provide an air metal arc electrode for use in the cutting and gouging of metal.

Another object is to provide a method for cutting or gouging metal using an air metal arc electrode.

These and other objects will more clearly appear when taken in conjunction with the following disclosure, the appended claims and the accompanying drawing, wherein:

STATEMENT OF THE INVENTION

Figure 1:
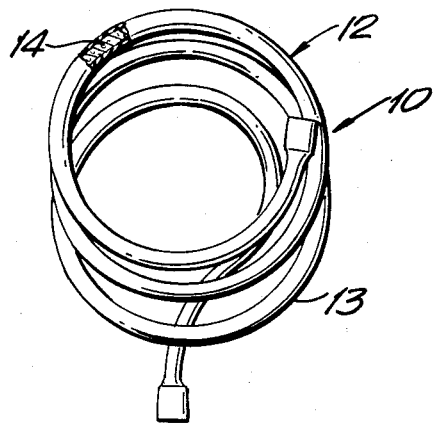
FIG. 1 is a three-dimensional view of one embodiment of the electrode in the form of a coil.

One embodiment of the invention is directed to a cored tubular metallic arc electrode for use in gas-assisted (e.g., air) cutting and gouging of metal substrates comprising a metal tube and a core composition consisting essentially of compacted particulate carbonaceous material and optionally containing 0 to about 20% by weight of material (additive) based on the total weight of the core composition, the additive being selected from the group consisting of arc stabilizers, fluxing agents, and gas formers. The particulate carbonaceous material may be selected from the group consisting of graphite, carbon, anthracite, bituminous coal and lignite. It is preferred that the carbonaceous material contain at least about 75% of weight of carbon. Natural graphite is particularly preferred containing at least about 85% carbon.

The core composition may comprise about 3 to 20% by weight of the total electrode, e.g., about 5% to 15% by weight or about 5% to 10%.

Another embodiment of the invention resides in a method for the electric arc cutting or gouging of a metal substrate. The method comprises providing at least one cored tubular metallic arc electrode formed of a metal tube and a core composition consisting essentially of carbonaceous material and optionally containing 0 to about 20% by weight of particulate material based on the total weight of the core composition, the material being selected from the group consisting of arc stabilizers, fluxing agents, and gas formers.

The method comprises establishing an electric arc between the end of the electrode and the metal substrate to effect the cutting or gouging thereof, feeding a stream of gas, e.g., air, under pressure to the area being cut or gouged, and continuing the cutting or gouging while continually feeding the stream of gas under pressure to the area being cut or gouged.

The cored tubular metallic electrode is characterized by markedly improved gas-assisted gouging and cutting properties compared to conventional gas-assisted carbon electrodes.

The wire electrode is capable of providing a precisely controlled electric arc using DC power, preferably with positive polarity and at a constant voltage. The heat generated by the arc causes the base metal and the wire to melt locally to produce a pool of molten metal which is removed substantially instantly by an accompanying air blast, the air stream being properly focused to the area being cut.

By employing the novel wire electrode of the invention, a clean, shiny gouge is generally obtainable in a consistent and reproducible manner in the desired location intended by the operator. The wire electrode is capable of performing at very fast travel speed with very good accuracy. An advantage of the invention is that minimal post gouging treatment is required to prepare the gouge for subsequent operations, such as welding, painting, metal spraying and the like.

Another advantage of the wire electrode over the carbon electrode is that the wire electrode can carry a very high current, if desirable. One diameter of wire can cover a range of currents that would require at least three or more sizes of carbon electrodes to provide the same operable current range.

The wire electrode of the invention is capable of precise gouging and cutting operations, such as removing rivets, spot welds, cutting hand holds or access panels in thin sheets, removing fillet and groove welds, cutting sheet and plate, removing attachments, removing overlays and hard surfaces, removing cracks and defects, among other uses.

DETAILS OF THE INVENTION

The invention is particularly useful in the form of continuous electrodes. Since a metal tube is used, e.g. mild steel, compared to the fragile carbon electrode, continuous metal cutting or gouging can be carried out with minimum downtime. Moreover, by optionally employing arc stabilizers, fluxing agents and gas formers, a stable electric arc can be maintained for a substantial period of time until the continuous electrode is used up or interrupted after completion of cutting or gouging.

One embodiment of a continuous electrode is shown in FIG. 1 which depicts a coil 10 of a tubular metal arc electrode 12 for semi or fully automatic processes. Such an electrode may have, for example, an outside diameter ranging from about 0.025 to ⅜ inch, or preferably from about 1/16 to = inch. The wall thickness will vary according to the outside diameter. One embodiment of a cored tubing is one having an outside diameter of about 0.05 inch and a wall thickness of about 0.008 to 0.015 inch or 0.01 to 0.02 inch.

The tube 13 of the electrode may be made of mild steel, such as 1030 steel, although other wrought metals may be employed. However, low carbon steels are preferred.

Figure 2:
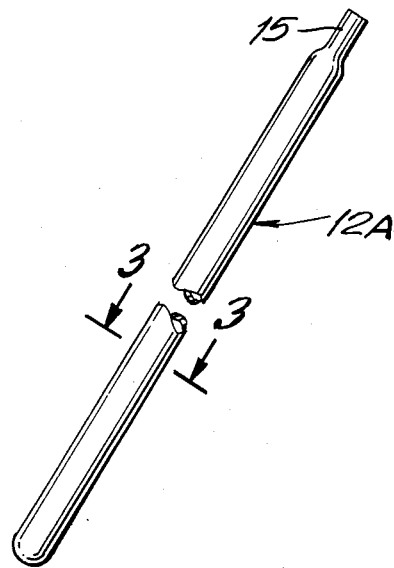
FIG. 2 is illustrative of an electrode in the shape of a rod.
Figure 4:
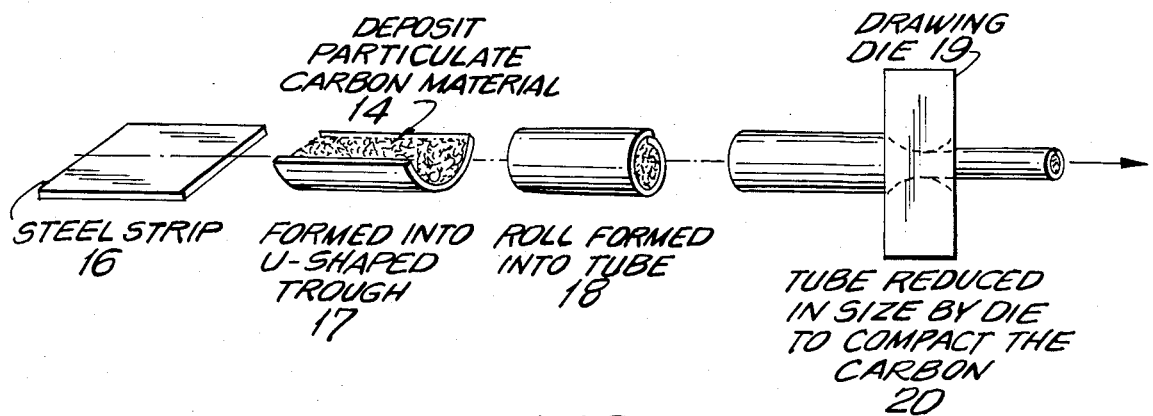
FIG. 4 is a schematic drawing showing stepwise the production of the cored tubular electrode starting with a metal strip which is formed into a U-shaped trough to which is fed particulate carbon material and, after roll-forming into a tube, is finally drawn through a die to compact the carbon material therein.

The electrode 12 may be fabricated in stepwise fashion as shown by the schemtic drawing of FIG. 4 by forming a strip of type 1030 steel 16 of about 0.012 inch thick and 0.475 inch wide into a U-shaped trough 17 by feeding it through successive forming rollers. The core material 14 is fed into the trough, and later forming stations gradually close the strip into a round tube 18. Thereafter, tube 18 is drawn to size through die 19 with the core material within it which is consolidated or compacted by virtue of the reduction in size of the tube during drawing at 20. FIG. 2 is the cross section of the completed tube.

Figure 3:
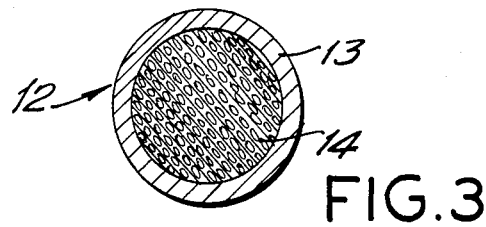
FIG. 3 is a cross section of FIG. 2 taken along line 3—3.

FIG. 3 is illustrative of the cored tubular electrode of predetermined length comprising tube 12A which is similar to continuous tubular electrode 12 of FIG. 1 with the exception it is used manually in rod or stick form, the open end of the tube being pinched or closed at 15.

As stated hereinabove, at least one additive may be optionally included in the core composition, such additives being selected from the group consisting of arc stabilizers, fluxing agents, and gas formers.

The arc stabilizers include those selected from the group consisting of alkali metal and alkaline earth metal compounds, such compounds including silicates, oxides, carbonates, etc. The carbonates are advantageous in that they are gas formers.

Fluxing agents include iron oxide, iron carbonate, $TiO_2$, $CaCO_3$, $ZrO_2$, and also the alkali metal and alkaline earth metal fluorides.

The gas formers may include iron carbonate, organics (e.g., cellulose), hydrated minerals (Bentonite, Fuller's Earth, mica, etc.), among others. These generate gases in the arc, such as $CO_2$ and steam, which aid in blowing the molten metal from the gouged area. Vapor formers may also be used as additives, such as ZnO, low melting fluorides, and the like.

The tubular portion of the electrode is preferably made of wrought mild steel, such as the steels designated as 1008, 1010, 1020, 1030, 1040, 1060, 1080, otherwise referred to as carbon steel, low carbon steel being preferred. The tubular portion of the electrode may be made of other wrought metals, available in strip form capable of being formed into a tubular electrode of sufficient mechanical strength and capable of being handled by conventional wire feeding devices.

Test results using a 1/16 diameter cored wire electrode of the invention have indicated that markedly improved results can be obtained as determined by metal removal rate as a function of current input. Generally speaking there is a limit as to the amount of current that can be applied to an electrode, especially a carbon electrode, in that the total electrode tends to overheat. By using the tubular electrode of the invention in gas-enhanced gouging, e.g., air-enhanced gouging, the amount of current can be substantially increased with the attending advantages of markedly improved metal removal. This is not necessarily the case using a gas-assisted carrbon electrode.

Gouging tests have been carried out on heavy steel plate using both stringer and weave techniques over a wide range of parameters. The tubular wire electrode had a diameter of 7/64 inch. In the stringer technique, the gouging is conducted in a straight line direction, the gouge being relatively narrow; whereas, in the weave technique, the gouging proceeds in the forward direction with a side-to-side motion, thus providing a wider gouge.

The advantages which accrue from the cored tubular electrode of the invention are as follows: (1) a bright shiny gouge is produced; (2) the ratio of metal gouged to the amount of electrode consumed is substantially over 1:1, for example, typically 2:1 or 3:1, (3) a desirable gouge contour is readily and consistently produced; (4) the tubular electrode of the invention can produce deep gouges; and (5) it is easier to remove any residual dross, if any.

At wire feed speeds of 50 to 150 inches per minute (ipm), greater metal removal per unit weight of cored wire consumed is obtainable.

The tests were conducted on 1/16 diameter cored electrode made of 1008 steel and containing compacted carbon in the form of natural graphite. The graphite referred to as Dixon No. 1104 contained about 94% carbon. The particulate graphite had a particle size of 100% through 20 mesh (U.S. Standard) with about 50% plus 50 mesh. The graphite in the tubular electrode consituted about 8% of the total weight with the steel tube 92% of the total weight of the cored electrode.

The 1/16 inch diameter cored wire electrode was capable of operating over a substantial wire feed range.

In a sampling of tests conducted using 1/16 diameter core wire electrode for cutting 16 gauge steel sheet (0.062"), a wire feed speed of 50 inches per minute (ipm) was found to be sufficient at voltages ranging from about 16 to 20, even when the wire feed speed varied from 50 to 80 ipm. These test are given below:

CUTTING OF 16 GAUGE STEEL USING 1/16 DIAMETER CORED TUBULAR ELECTRODE OF THE INVENTION

| Test | W.F.S.* | Approx. Amps. | Volts | Air Pressure p.s.i. | General Comments |
|---|---|---|---|---|---|
| 1 | 50 | 100 | 15 | 60 | Voltage was low, cutting achieved |
| 2 | 50 | 100 | 16 | 60 | Acceptable |
| 3 | 50 | 100 | 17 | 60 | Acceptable |
| 4 | 50 | 100 | 16.5 | 60 | Acceptable |
| 5 | 50 | 100 | 15.5 | 60 | Voltage low |
| 6 | 50 | 100 | 16 | 60 | Acceptable |
| 7 | 50 | 100 | 16.2 | 60 | Good |
| 8 | 50 | 100 | 16.2 | 60 | Good |
| 9 | 50 | 100 | 16.2 | 60 | Good |
| 10 | 60 | 100 | 16.2 | 60 | Good |
| 11 | 70 | 100 | 16.2 | 60 | Good |
| 12 | 70 | 100 | 17 | 60 | Very good |
| 13 | 70 | 100 | 17.5 | 60 | Very good |
| 14 | 80 | 135 | 18 | 80 | Very good |
| 15 | 80 | 135 | 19 | 80 | Very good |
| 16 | 80 | 135 | 20 | 80 | Very good |
| 17 | 80 | 135 | 21 | 80 | Very good |
| 18 | 80 | 135 | 22 | 80 | Very good |
| 19 | 50 | 100 | 15 | 80 | Volts too low |
| 20 | 50 | 100 | 16 | 80 | Acceptable |
| 21 | 50 | 100 | 17 | 80 | Very good |
| 22 | 50 | 100 | 18 | 80 | Very good |
| 23 | 50 | 100 | 18 | 80 | Angle of gun shallow, not too effective |
| 24 | 50 | 100 | 18 | 80 | Perpendicular gun angle gave clean edges |
| 25 | 50 | 100 | 19 | 80 | Very good |
| 26 | 50 | 100 | 20 | 80 | The high voltage works well but offers no advantage |
| 27 | 50 | 100 | 21 | 80 | The high voltage works well but offers no advantage |
| 28 | 50 | 100 | 21 | 80 | The high voltage works well but offers no advantage |
| 29 | 50 | 100 | 22 | 80 | The high voltage works well but offers no advantage |
| 30 | 50 | 100 | 23 | 80 | The high voltage works well but |

-continued
CUTTING OF 16 GAUGE STEEL USING 1/16 DIAMETER CORED TUBULAR ELECTRODE OF THE INVENTION

| Test | W.F.S.* | Approx. Amps. | Volts | Air Pressure p.s.i. | General Comments |
|---|---|---|---|---|---|
| 31 | 50 | 100 | 24 | 80 | offers no advantage The high voltage works well but offers no advantage |
| 32 | 50 | 100 | 25 | 80 | The high voltage works well but offers no advantage |
| 33 | 50 | 100 | 16 | 80 | Smooth, narrow cut |
| 34 | 50 | 100 | 25 | 80** | The higher voltage did not enable higher travel speed |
| 35 | 50 | 100 | 25 | 80** | The higher voltage did not enable higher travel speed |

*W.F.S. = wire speed in inches per minute (ipm).
**Cuts made at different voltages did not generally produce cutting speeds for manual travel of the arc.

With a gun angle of about 90°, a travel speed of about 14 to 25 ipm was used. The arc time varied generally from 14 to 21 seconds. The length of cut in some instances ranged from about 3.8" to 4.8". The underside of the cuts showed some dross attachment. However, the dross could be chipped away. By employing a relatively short electrode stick-out relative to the substrate being cut, the cut generally has parallel sides and there is minimum dross contamination.

It was noted that using 100 amperes at 16 volts produced a tiny arc with a spray transfer type of steady hum. A cutting angle of 90° appeared to be most effective for clean straight edges. Typical cutting speeds of manual travel of the arc ranged from 15–30 ipm. The heat input ranged from about 3 to 12 KJ/in (kilojoules per inch of cut).

An optimum cutting parameter obtained with some extrapolations is given below:
  17 volts
  50 ipm (wire feed speed)
  100 amperes
  60–100 p.s.i. air pressure
  20 i.p.m. travel speed (can be increased to 36 i.p.m. manually)
  5 KJ/in. heat input
  75 sq. inches per hour exposed (assuming 100% duty cycle)
  2 lbs. wire per hour consumed (assuming 100% duty cycle)
  Approximately 10 cu. inches per hour removed based on an average cut width of ⅛" (assuming 100% duty cycle)
  Approximately 3 lbs, metal removed per hour (assuming 100% duty cycle)
  Metal to wire usage ratio 1.5:1

The reference to 100% duty cycle means full use of the time from the beginning to the end of the cutting cycle. While the cutting operation works effectively over a voltage range of about 16 to 25, the voltages at the lower range tend to produce better quality cuts.

In an actual demonstration, the cored tubular electrode of the invention was successfully used to cut a typical automobile car door, such as removing spot welds, component parts, and the like, using a voltage of about 17–20 and a wire feed speed of 50 ipm at an applied air pressure of 60 psi (gage). Very clean, narrow cuts were produced with substantially no panel distortion and negligible paint damage.

The core steel wire electrode in the invention is superior to copper-coated carbon electrode in that higher gouging and cutting rates are obtainable and also in that a wider range of operating parameters is permissible and practical.

As stated herein before, the sheath forming the tubular electrode is preferably made of carbon steel or other ferrous metal, although other types of wrought metal can be used capable of being formed into a tubular electrode of sufficient mechanical strength and capable of being easily handled by conventional wire feeding devices.

The cored electrode of the invention can be used to cut or gouge a wide variety of metals, such as ferrous metals (e.g., steels, cast irons, ferrous alloys, etc.), aluminum, aluminum alloys, copper and copper alloys, titanium and titanium alloys, nickel-base alloys, and cobalt-base alloys.

In cutting or gouging the metals, gas, such as air under pressure, is directed to the area being cut to drive the molten metal away. The the air may be fed at a pressure ranging from about 10 to 150 psig along the length of the electrode or as a sheath surrounding the electrode, or a plurality of streams either concentrically arranged about the electrode, or as individual streams. The air streams need not have the same focal point so long as the air stream or streams preferably have a proper flow pattern.

Although the present invention has been described in conjunction with the preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A cored tubular metallic arc electrode for use in gas-assisted cutting and gouging of metal substrates comprising a wrought drawn metal tube with a core composition consisting essentially of particulate carbonaceous material drawn and compacted therein by reduction of said metal tube, said carbonaceous material containing at least about 75% carbon, said tube containing 0 to about 20% by weight of an additive based on the total weight of the core composition, the additive being selected from the group consisting of arc stabilizers, fluxing agents, and gas formers, said electrode characterized in use by reduced dross formation.

2. The cored electrode of claim 1, wherein the core composition constitutes about 3 to 20% by weight of the total electrode.

3. The cored electrode of claim 2, wherein the core composition constitutes about 5% to 10% by weight of the total electrode.

4. The cored electrode of claim 1, wherein said carbonaceous material is selected from the group consisting of graphite, carbon, anthracite, bituminous coal and lignite.

5. The cored electrode of claim 4, wherein the carbonaceous material is natural graphite and contains at least about 85% carbon.

6. The cored electrode of claim 5, wherein the wrought metal tube is carbon steel.

7. The cored electrode of claim 1, wherein the wrought tubular electrode has an outside diameter of about 0.025 to ⅜ of an inch and a wall thickness of about 0.005 to 0.05 inch.

8. The electrode of claim 7, wherein the wrought tubular electrode has an outside diameter of about 1/16 to ⅛ inch and a wall thickness of about 0.008 to 0.015 inch.

9. A method for the electric arc cutting or gouging of a metal substrate which comprises:
providing at least one cored tubular metallic arc electrode formed of a wrought metal drawn tube with a core composition consisting essentially of particulate carbonaceous material containing at least about 75% carbon drawn and compacted therein by reduction of said metal tube, said tube containing 0 to about 20% by weight of an additive based on the total weight of the core composition, said additive being selected from the group consisting of arc stabilizers, fluxing agents, deoxidizers and gas formers,
feeding a stream of gas under pressure to the area being cut or gouged,
and continuing said cutting or gouging while continually feeding said stream of gas under pressure to said area,
said electrode and method characterized in use by reduced dross formation.

10. The method of claim 8, wherein the stream of gas is fed under pressure along the length of the electrode to the area being cut and gouged.

11. The method of claim 9, wherein the core composition constitutes about 3% to 20% by weight of the total electrode.

12. The method of claim 11, wherein the core composition constitutes about 5% to 10% by weight of the total electrode.

13. The method of claim 9, wherein the carbonaceous materials is selected from the group consisting of graphite, carbon, anthracite, bituminous coal and lignite.

14. The method of claim 13, wherein the carbonaceous material is graphite containing at least about 85% carbon.

15. The method of claim 9, wherein the wrought tubular electrode has an outside diameter of about 0.025 to ⅜ of an inch and a wall thickness of about 0.005 to 0.05 inch.

16. The method of claim 15, wherein the wrought tubular electrode has an outside diameter of 1/16 to ⅛ inch and a wall thickness of about 0.008 to 0.0015 inch.

17. The method of claim 9, wherein the wrought metal tube is carbon steel.

18. The method of claim 17, wherein the gas is fed along the length of the electrode at a nozzle pressure of about 10 to 150 psig.

19. The method of claim 18, wherein the gas is fed as an annular sheath surrounding said electrode.

* * * * *